United States Patent
Fukuzawa (10) Patent No.: US 10,645,265 B2
(45) Date of Patent: May 5, 2020

(54) IMAGE PICKUP APPARATUS

(71) Applicant: CANON KABUSHIKI KAISHA, Tokyo (JP)

(72) Inventor: Kazuhiro Fukuzawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/115,154

(22) Filed: Aug. 28, 2018

(65) Prior Publication Data

US 2019/0068849 A1 Feb. 28, 2019

(30) Foreign Application Priority Data

Aug. 31, 2017 (JP) .................. 2017-167756
Aug. 31, 2017 (JP) .................. 2017-167757
Jun. 20, 2018 (JP) .................. 2018-116889
Jun. 20, 2018 (JP) .................. 2018-116890

(51) Int. Cl.
*H04N 5/225* (2006.01)
*H04N 5/232* (2006.01)
*H02N 2/16* (2006.01)
*G03B 17/56* (2006.01)
*H02N 2/00* (2006.01)

(52) U.S. Cl.
CPC ......... *H04N 5/2253* (2013.01); *G03B 17/561* (2013.01); *H02N 2/001* (2013.01); *H02N 2/163* (2013.01); *H04N 5/2252* (2013.01); *H04N 5/2259* (2013.01); *H04N 5/23296* (2013.01); *H04N 5/23299* (2018.08)

(58) Field of Classification Search
CPC ...... G03B 17/561; H02N 2/001; H02N 2/163; H04N 5/2252; H04N 5/2253; H04N 5/2259; H04N 5/23296; H04N 5/23299
See application file for complete search history.

(56) References Cited

U.S. PATENT DOCUMENTS

| | | | |
|---|---|---|---|
| 9,874,308 B2* | 1/2018 | Saika | B64D 47/08 |
| 2004/0190863 A1 | 9/2004 | Nishimura | |
| 2007/0040930 A1 | 2/2007 | Lee | |
| 2008/0303900 A1* | 12/2008 | Stowe | F16M 11/10 348/143 |
| 2014/0219647 A1* | 8/2014 | Lai | G03B 17/561 396/428 |
| 2017/0192342 A1* | 7/2017 | Liu | G03B 17/561 |
| 2017/0289456 A1* | 10/2017 | David | H02K 5/15 |

(Continued)

FOREIGN PATENT DOCUMENTS

| | | |
|---|---|---|
| CN | 1606225 A | 4/2005 |
| CN | 102291042 A | 12/2011 |

(Continued)

*Primary Examiner* — Amy R Hsu
(74) *Attorney, Agent, or Firm* — Canon USA, Inc., IP Division (57) ABSTRACT

Provided is a camera unit including an image pickup element, and a ring-shaped ultrasonic motor that includes a rotor and a stator, the ring-shaped ultrasonic motor being disposed coaxial with a tilting rotation shaft and rotationally driving the camera unit about the tilting rotation shaft in a tilt direction. In a direction in which the tilting rotation shaft extends, the rotor of the ultrasonic motor is disposed on a camera unit side with respect to the stator of the ultrasonic motor.

19 Claims, 9 Drawing Sheets

(56) References Cited

U.S. PATENT DOCUMENTS

2017/0307136 A1* 10/2017 Wei ..................... G03B 17/561
2017/0307961 A1* 10/2017 Tian ..................... F16C 11/045

FOREIGN PATENT DOCUMENTS

| | | |
|---|---|---|
| CN | 104698722 A | 6/2015 |
| CN | 206077258 U | 4/2017 |
| CN | 107097966 A | 8/2017 |
| CN | 207039754 U | 2/2018 |
| JP | 2006-041919 A | 2/2006 |
| JP | 2007-189777 A | 7/2007 |
| JP | 2010-075009 A | 4/2010 |

* cited by examiner

FIG. 9

IMAGE PICKUP APPARATUS

BACKGROUND OF THE INVENTION

Field of the Invention

The present disclosure relates to an image pickup apparatus.

Description of the Related Art

There are image pickup apparatuses that can change the panning and tilting angles of a camera unit to perform imaging of an image at a position and direction desired by the user.

There is an image pickup apparatus having a typical tilting and rotating function that tilts and rotates a camera unit by rotating, through a deceleration mechanism, a gear fixed to a tilting rotation shaft with a stepping motor disposed below the tilting rotation shaft.

Similarly, in an image pickup apparatus having a typical panning and rotating function that pans and rotates a camera unit by rotating, through a deceleration mechanism, a gear fixed to a pan rotation shaft with a stepping motor disposed near the pan rotation shaft (see Japanese Patent Laid-Open No. 2006-41919).

However, as in the case of the conventional art described above, in the image pickup apparatuses using a stepping motor, there are cases in which the output is slow with respect to the input to the motor, in other words, there are cases in which responsiveness is not good.

SUMMARY OF THE INVENTION

Accordingly, the present disclosure provides an image pickup apparatus that includes a drive source that has excellent responsiveness.

In order to overcome the problem described above, an image pickup apparatus of the present disclosure is configured in the following manner. In other words, the image pickup apparatus includes a camera unit including an image pickup element, and a ring-shaped ultrasonic motor that includes a rotor and a stator, the ring-shaped ultrasonic motor being disposed coaxial with a tilting rotation shaft and rotationally driving the camera unit about the tilting rotation shaft in a tilt direction. In the image pickup apparatus, in a direction in which the tilting rotation shaft extends, the rotor of the ultrasonic motor is disposed on a camera unit side with respect to the stator of the ultrasonic motor.

Further features of the present invention will become apparent from the following description of exemplary embodiments with reference to the attached drawings.

DESCRIPTION OF THE EMBODIMENTS

Figure 1:
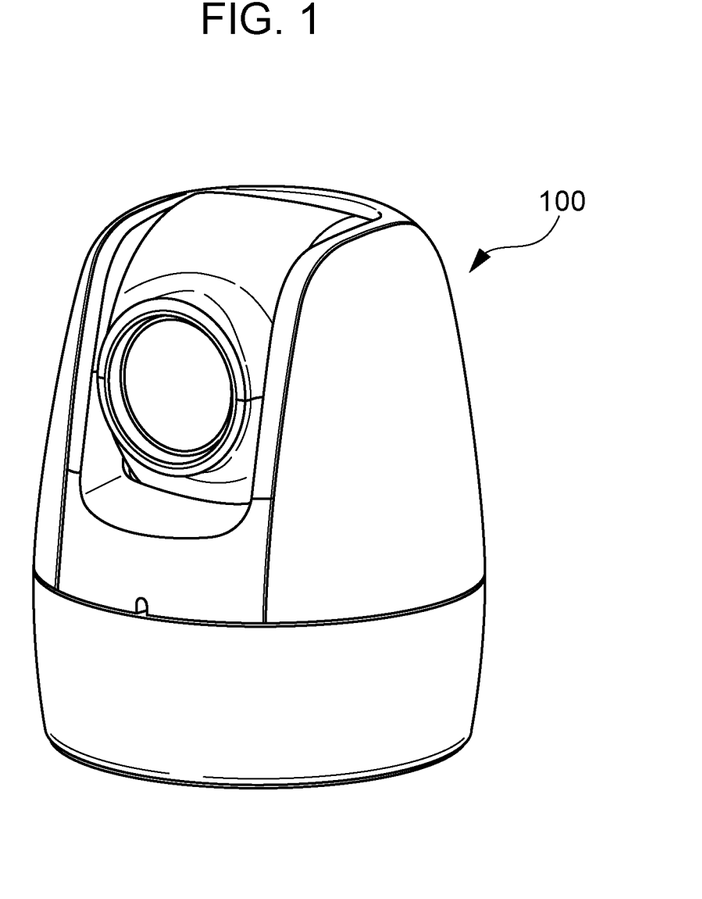
FIG. 1 is an external view of an image pickup apparatus according to an exemplary embodiment of the present disclosure.
Figure 3:
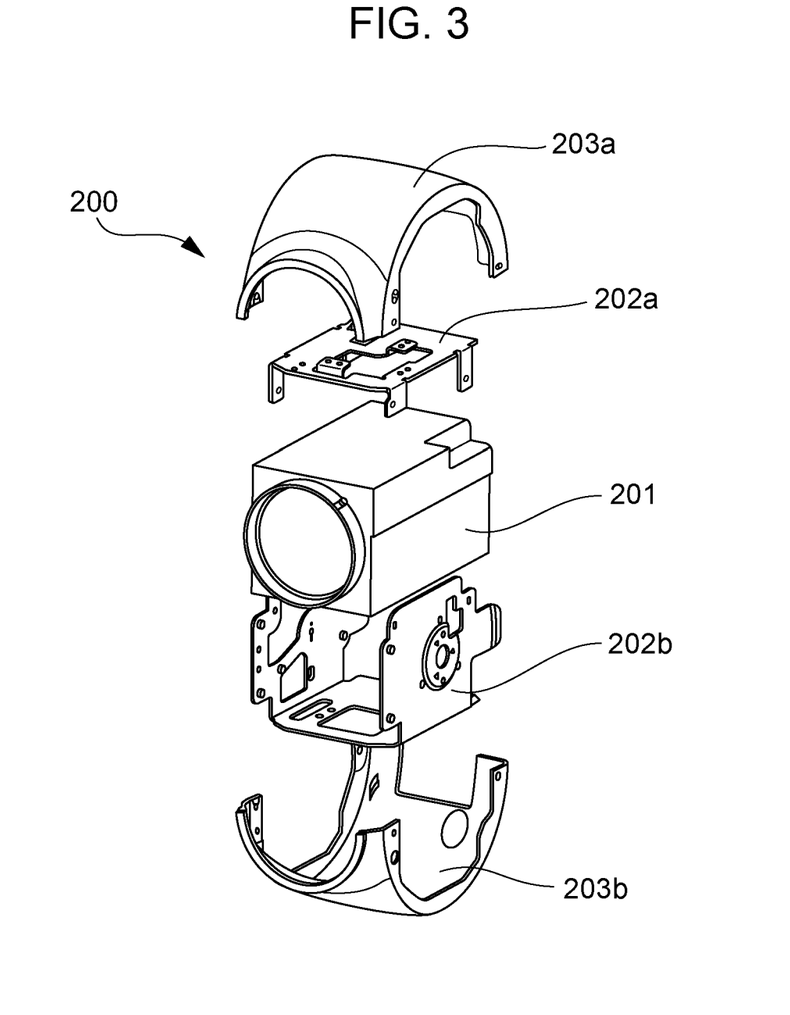
FIG. 3 is an exploded view of a camera unit according to the exemplary embodiment of the present disclosure.
Figure 4:
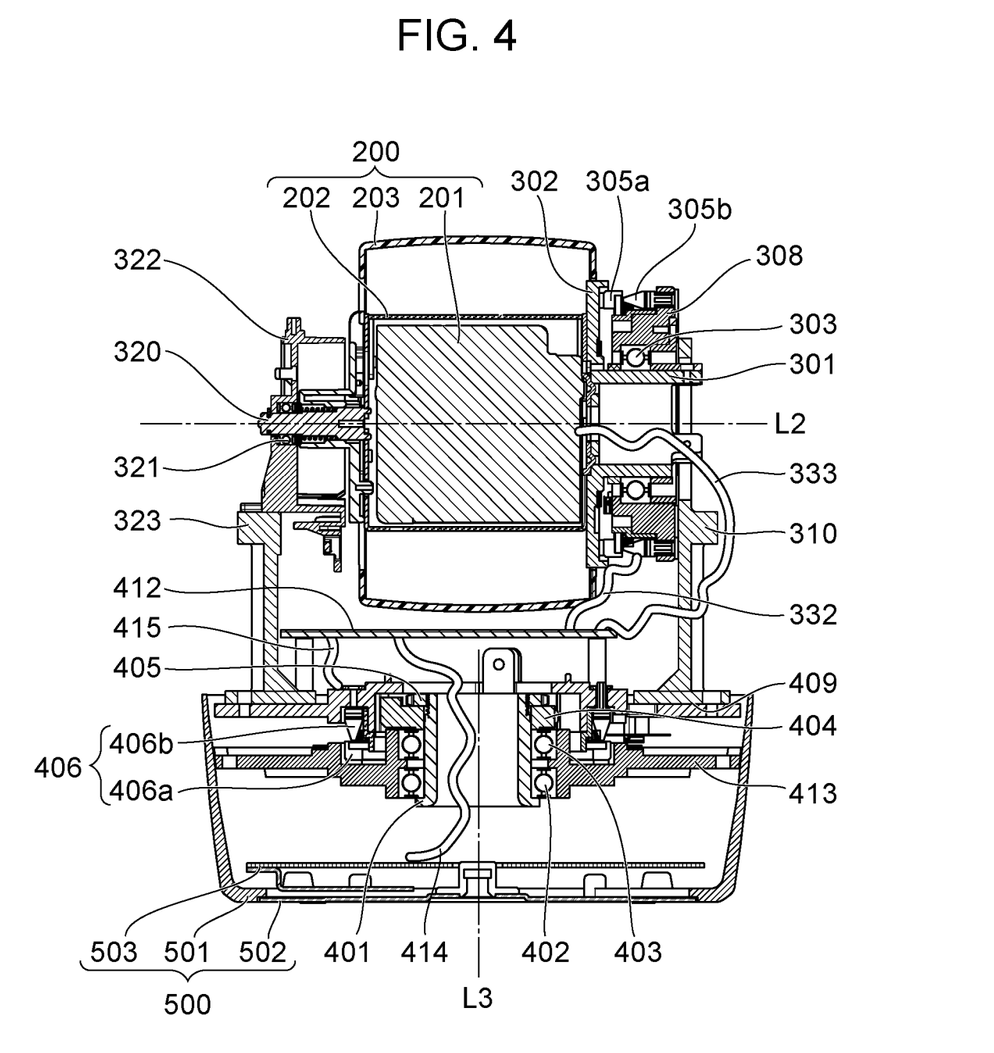
FIG. 4 is a cross-sectional view of the image pickup apparatus according to the exemplary embodiment of the present disclosure.

An exemplary embodiment of the present disclosure will be described hereinafter. FIG. 1 illustrates an external view of an image pickup apparatus according to the exemplary embodiment of the present disclosure, FIG. 2 is an exploded view of a tilt unit, FIG. 3 is an exploded view of a camera unit, and FIG. 4 illustrates a cross-sectional view of the image pickup apparatus.

An image pickup apparatus 100 includes a camera unit 200 that performs imaging, and a tilt unit 300 that rotates the camera unit 200 about a tilt axis L2 in a tilt direction. The image pickup apparatus 100 further includes a pan unit 400 that rotates the camera unit 200 about a pan axis L3 in a pan direction, and a base unit 500 that serves as a fixed portion when the image pickup apparatus 100 is attached to a wall surface of a ceiling.

Camera Unit 200

Figure 2:
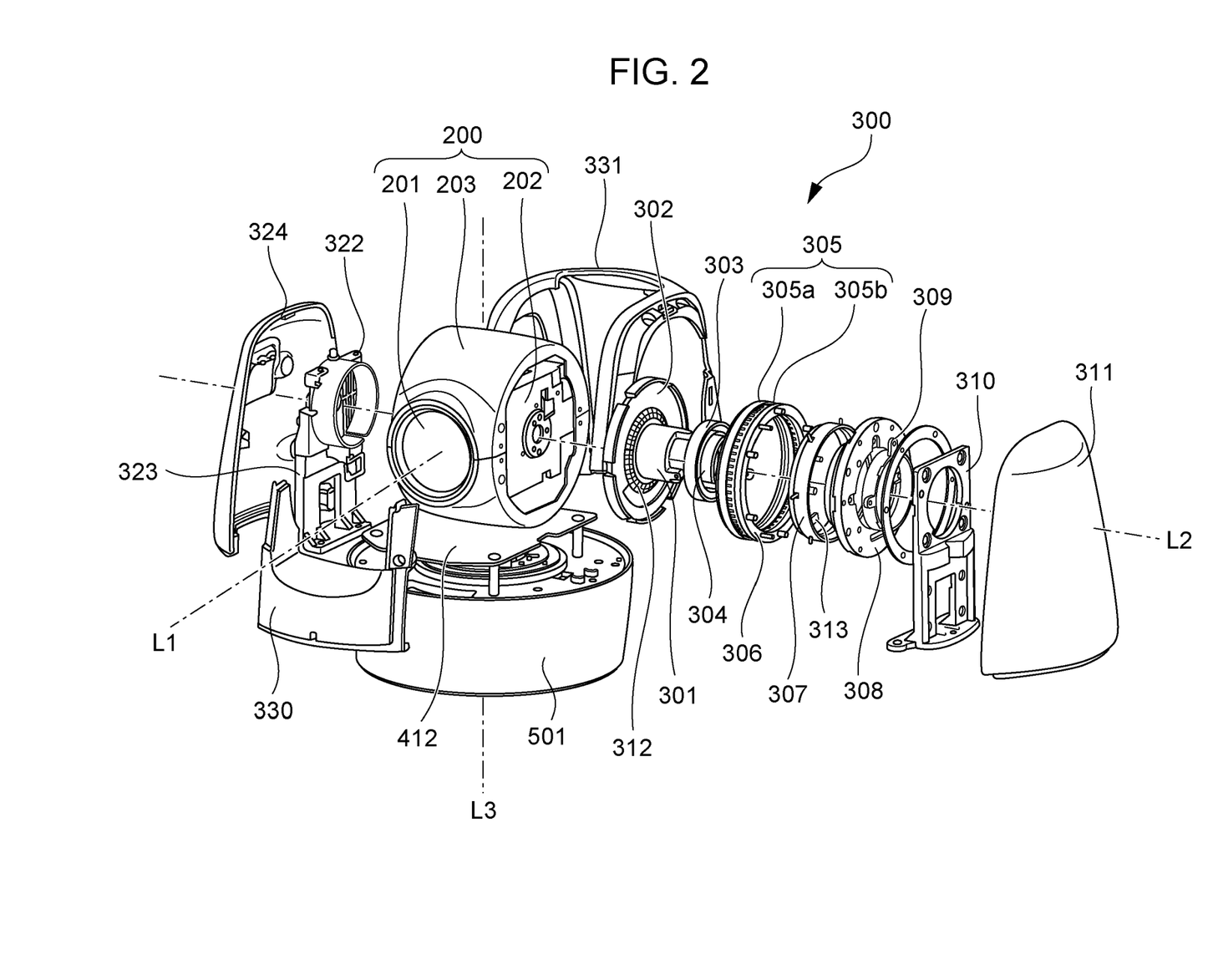
FIG. 2 is an exploded view of a tilt unit according to the exemplary embodiment of the present disclosure.

As illustrated in FIG. 2, the camera unit 200 includes a camera 201 that can perform imaging in an optical axis L1 direction, a case member 202, and a camera cover 203. The camera 201 includes an image pickup element and a plurality of lens. As illustrated in FIG. 3, the case member 202 includes an upper case 202a formed of sheet metal, and a lower case 202b formed of sheet metal. The camera 201 is fitted in and supported by the case member 202. The camera cover 203 includes an upper cover 203a formed of resin, and a lower cover 203b formed of resin. The camera cover 203 covers a portion of the camera 201 and a portion of the case member 202. Furthermore, as illustrated in FIG. 2, the camera unit 200 and the tilt unit 300 are protected by fitting and fixing a pan cover 331, a front cover 330, a side cover 324, and a side cover 311 to a bottom case 501 described later.

Tilt Unit 300

Figure 5:
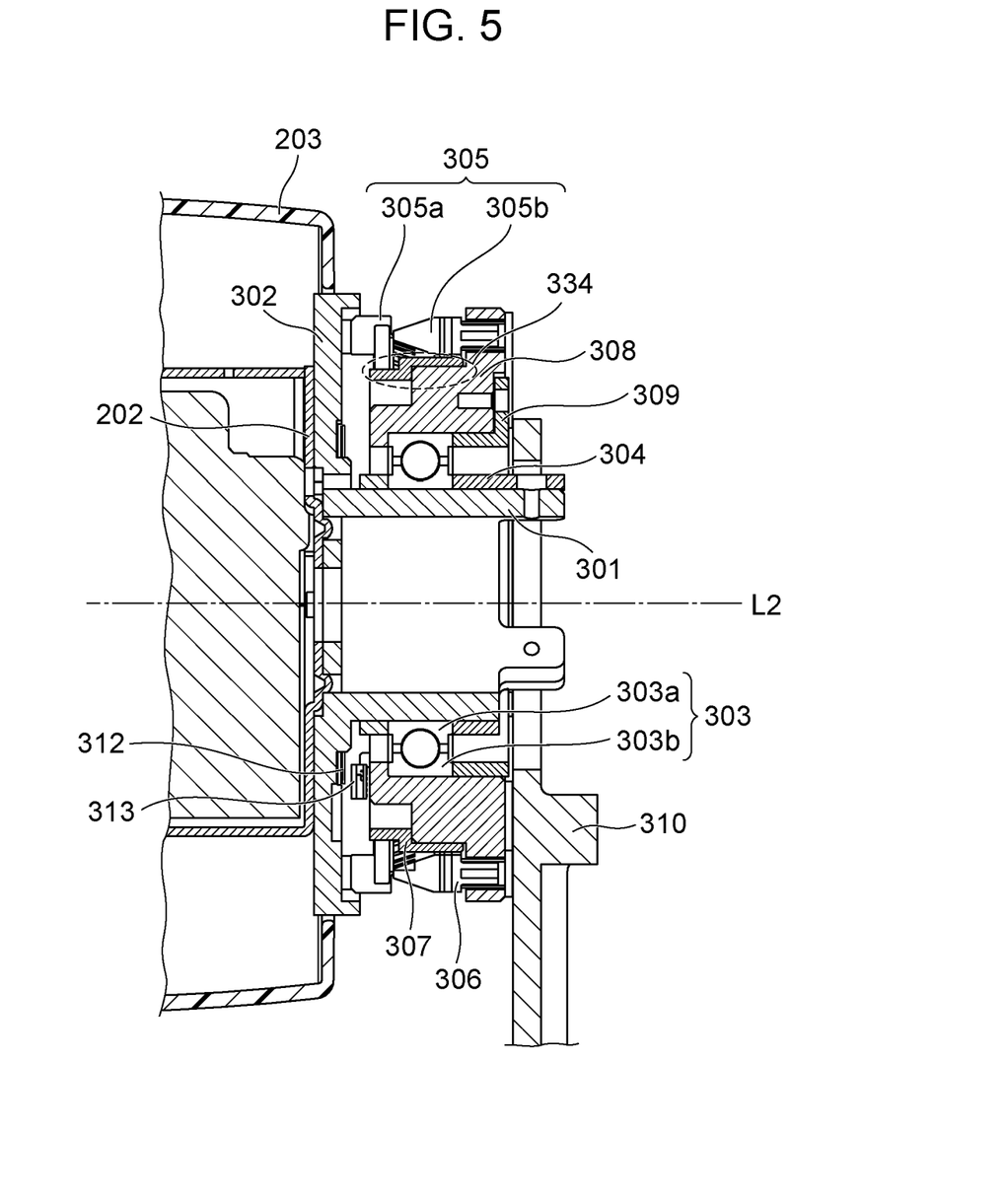
FIG. 5 is a cross-sectional view around a tilting rotation shaft according to the exemplary embodiment of the present disclosure.
Figure 6:
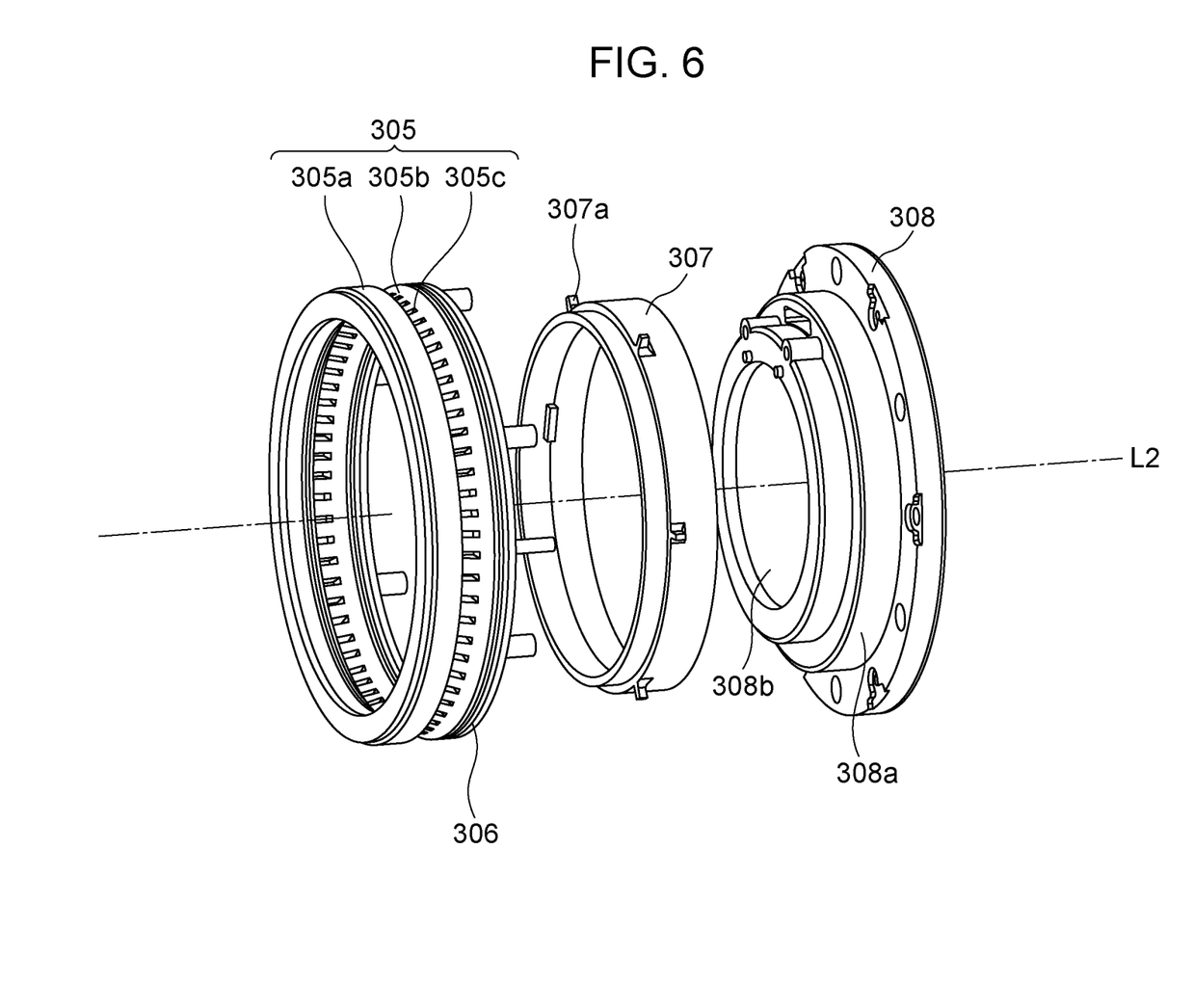
FIG. 6 is an exploded view around an ultrasonic motor of the tilting rotation shaft according to the exemplary embodiment of the present disclosure.

FIG. 5 is a cross-sectional view around a tilting rotation shaft according to the exemplary embodiment of the present disclosure, and FIG. 6 is an exploded view of a portion around an ultrasonic motor of the tilting rotation shaft. The tilt unit 300 includes a first rotation shaft 320, a second rotation shaft 301, an ultrasonic motor 305, a rotor fixing member 302, a first support member 323, a second support member 310, a bearing holder 322, and a rotation preventing member 307.

The first rotation shaft 320 serving as the tilting rotation shaft is rotatable about the tilt axis L2. One end of the first rotation shaft 320 is attached to the case member 202, and the other end is inserted inside a bearing 321. As illustrated in FIG. 4, the bearing 321 is fitted to and supported by the bearing holder 322. The bearing holder 322 is fitted and fixed to the first support member 323. As illustrated in FIG. 2, a portion of the bearing holder 322 has a cylindrical shape that holds the bearing 321.

As illustrated in FIG. 2, the rotor fixing member 302 has a circular shape, and as illustrated in FIG. 4, is inserted in an opening of the camera cover 203 and is fixed to a lateral side of the case member 202. Furthermore, a scale 312 of an encoder is fixed to the rotor fixing member 302.

The second rotation shaft 301 serving as the tilting rotation shaft is hollow inside and is integrally formed together with the rotor fixing member 302. The second rotation shaft 301 is rotatably supported about the tilt axis L2 by a bearing 303. The bearing 303 is supported by a first bearing holding member 304, a stator fixing member 308 described later, and a second bearing holding member 309.

The first bearing holding member 304 has a cylindrical shape, and fixes an inner ring 303a side of the bearing 303. The second bearing holding member 309 has a cylindrical shape and fixes an outer ring 303b side of the bearing 303. Furthermore, the bearing 303 is inserted inside and supported by a through hole 308b provided in the stator fixing member 308. Furthermore, the second bearing holding member 309 is inserted inside and fixed to the through hole 308b of the stator fixing member 308.

The first support member 323 is disposed on the side of the camera unit 200 on which the ultrasonic motor 305 is not disposed, and fixes the bearing holder 322. The first support member 323 is fixed to a pan base 409.

The second support member 310 is fixed to the pan base 409 so as to form a pair with the first support member 323. The second support member 310 is disposed on a side of the ultrasonic motor 305, which is opposite to the side on which the camera unit 200 is disposed. The second support member 310 fixes the stator fixing member 308.

A signal line 333 serving as a connecting member connects an imaging element substrate of the camera 201 and a control substrate 412 described later to each other. The signal line 333 is inserted inside (in an inner space) of the ultrasonic motor 305 and the second rotation shaft 301.

The rotation preventing member 307 prevents a stator 305b from rotating and moving relative to the stator fixing member 308 about the tilt axis L2. The rotation preventing member 307 is fitted into and supported by an attaching portion 308a on the stator fixing member 308 and is disposed in a fitting space 334 provided in a gap between the attaching portion 308a and the ultrasonic motor 305. The rotation preventing member 307 includes projections 307a that extend in a radial direction of the second rotation shaft 301 at substantially equal intervals. The projections 307a are inserted into gaps of a pectinate portion 305c of the stator 305b. With the above, the stator 305b is prevented from rotating and moving relative to the stator fixing member 308 about the tilt axis L2.

The encoder detects a turn angle of the camera unit 200 in the tilt direction. The scale 312 of the encoder is fixed on the rotor fixing member 302 so as to be coaxial with the rotation shaft 301. A sensor 313 of the encoder is disposed on the stator fixing member 308 so as to correspond to the scale 312 on the rotor fixing member 302. By reading the value of the sensor 313, the amount of rotation and movement of a rotor 305a relative to the stator 305b can be obtained and the tilting angle of the camera unit 200 can be detected.

The ultrasonic motor 305 is a driving source that rotates the camera unit 200 in the tilt direction and is formed of a ring-shaped member. As illustrated in FIG. 6, the ultrasonic motor 305 includes the annular stator 305b including a signal line 332 for driving, and the annular rotor 305a that is rotationally driven relative to the stator 305b. The ultrasonic motor 305 is coaxial with the second rotation shaft 301 and is disposed on an outer peripheral surface of the stator fixing member 308. In detail, the rotor 305a is disposed on a camera unit side and the stator 305b is disposed on a second support member side. Furthermore, the rotor 305a is installed on the rotor fixing member 302 so as to be coaxial with the rotation shaft 301.

The stator 305b is disposed coaxially with the rotation shaft 301 and in contact with the rotor 305a and is connected to the control substrate 412 described later with the signal line 332. A biasing member 306 is fitted on and supported by the stator fixing member 308 so as to bias the stator 305b towards the rotor 305a. In other words, the ultrasonic motor 305 and the biasing member 306 are held between the rotor fixing member 302 and the stator fixing member 308. In so doing, the biasing member 306 exerts biasing force that is sufficient for the stator 305b to rotate the rotor 305a. With such biasing force, the rotor 305a is rotated about the tilt axis L2 when the stator 305b is driven.

Driving of the camera unit 200 with the ultrasonic motor 305 will be described hereinafter. When a signal is input through the signal line 332 for driving, the stator 305b vibrates. The rotor 305a is rotated in the tilt direction with the vibration transmitted from the stator 305b. Furthermore, since the rotor 305a is fixed to the rotor fixing member 302, when the rotor 305a rotates, the rotor fixing member 302 also rotates about the second rotation shaft 301. In other words, the second rotation shaft 301 is rotated in the tilt direction with the rotation of the rotor 305a. Furthermore, since the case member 202 is fixed to the rotor fixing member 302, when the rotor fixing member 302 rotates, the camera unit 200 rotates as well.

As described above, by using the ultrasonic motor 305, an image pickup apparatus with better responsiveness, compared to an image pickup apparatus using a stepping motor, can be provided. Furthermore, the rotor of the ultrasonic motor 305 being disposed on the camera unit 200 side with respect to the stator of the ultrasonic motor 305 is a compact and efficient arrangement. More specifically, if the rotor and the stator are disposed at positions that are opposite to the positions of the present exemplary embodiment, different from the support member that supports the stator, a separate member that holds the rotor will be needed. Accordingly, the arrangement of the present exemplary embodiment can be said to be a compact and efficient arrangement.

Furthermore, while a stepping motor needs a deceleration mechanism, a deceleration mechanism that has a complex gear configuration will not be needed when using an ultrasonic motor. Furthermore, when a stepping motor is used, the deceleration mechanism is provided coaxially with the tilting rotation shaft, and the motor is disposed below the deceleration mechanism. However, in the present embodiment, the ultrasonic motor 305 is disposed coaxially with the second rotation shaft 301; accordingly, there is no need to dispose the motor under the second rotation shaft 301, which leads to size reduction. Furthermore, by disposing the signal line 333, which transmits a signal of an image taken by the camera 201 to the control substrate 412, inside the ultrasonic motor 305 and the rotation shaft 301, there is no need to provide a signal line on the side of the camera unit 200 opposite to the ultrasonic motor 305.

By forming the rotor fixing member 302 and second rotation shaft 301 as an integrally formed component, the number of components can be reduced. By disposing the bearing 303, the bearing holding member 309, bearing holding member 304, the rotation shaft 301, the signal line 333 inside the ultrasonic motor 305 and the through hole 308b of the stator fixing member 308, space can be reduced. Specifically, spaces for the bearings and the members that hold the bearings, which are spaces that are conventionally need in addition to the space for disposing the ultrasonic motor, can be reduced. Accordingly, the size of the body of the image pickup apparatus can be reduced.

Base Unit 500

As illustrated in FIG. 4, the base unit 500 includes the bottom case 501, a bottom sheet metal 502, and a power supply board 503.

The bottom case 501 is installed on a ceiling or a wall through the bottom sheet metal 502. The pan unit 400 described later is disposed inside the bottom case 501. The bottom sheet metal 502 is a member that is fixed to a ceiling or a wall. The power supply board 503 is a substrate for supplying power, and supplies power to the control substrate 412 through a signal line 414. The signal line 414 is inserted inside (in an inner space of) a pan rotation shaft 401 described later. The power supply board 503 is attached to the bottom sheet metal 502.

Pan Unit 400

Figure 7:
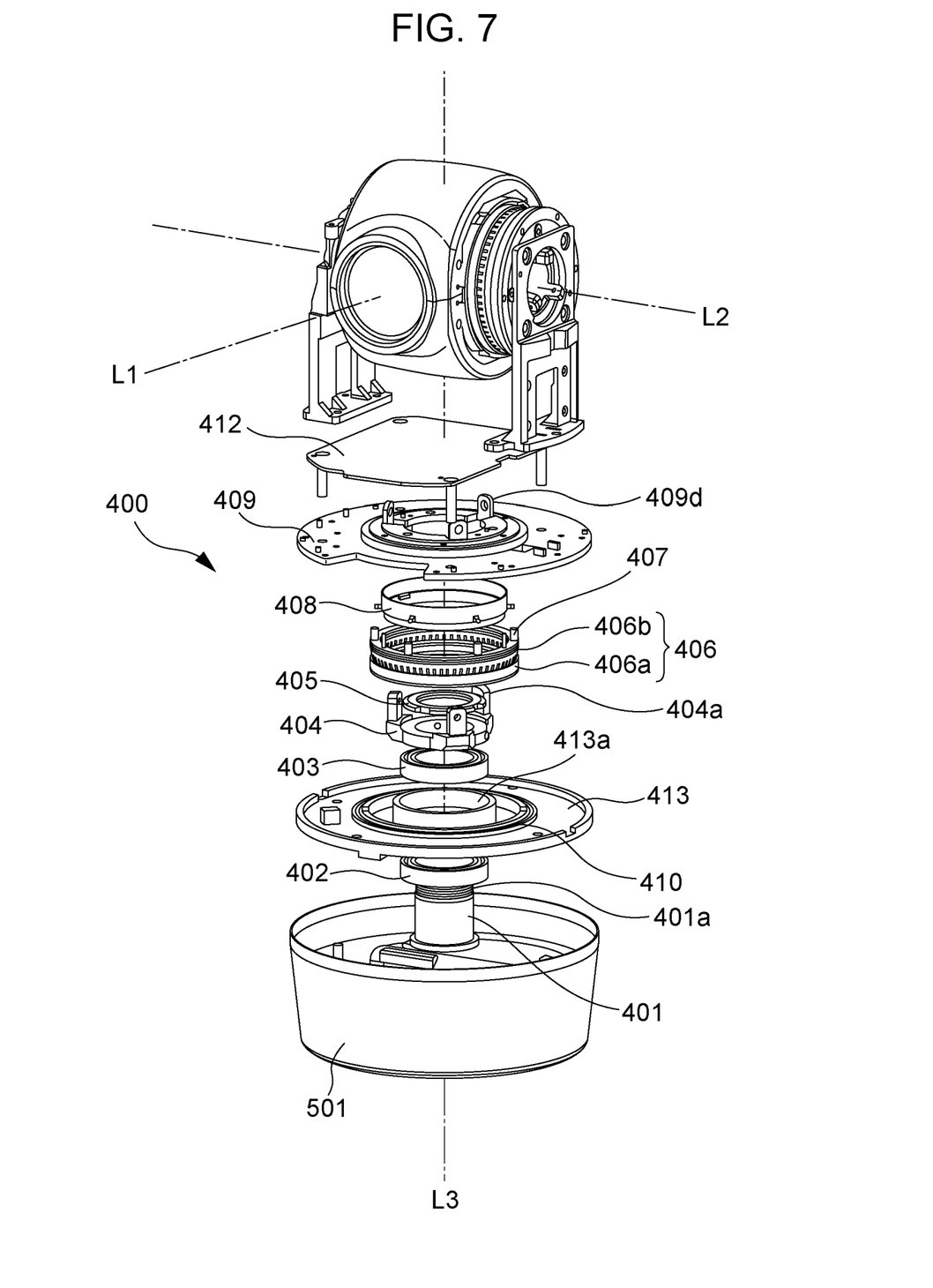
FIG. 7 is an exploded view of a pan unit according to an exemplary embodiment of the present disclosure.
Figure 8:
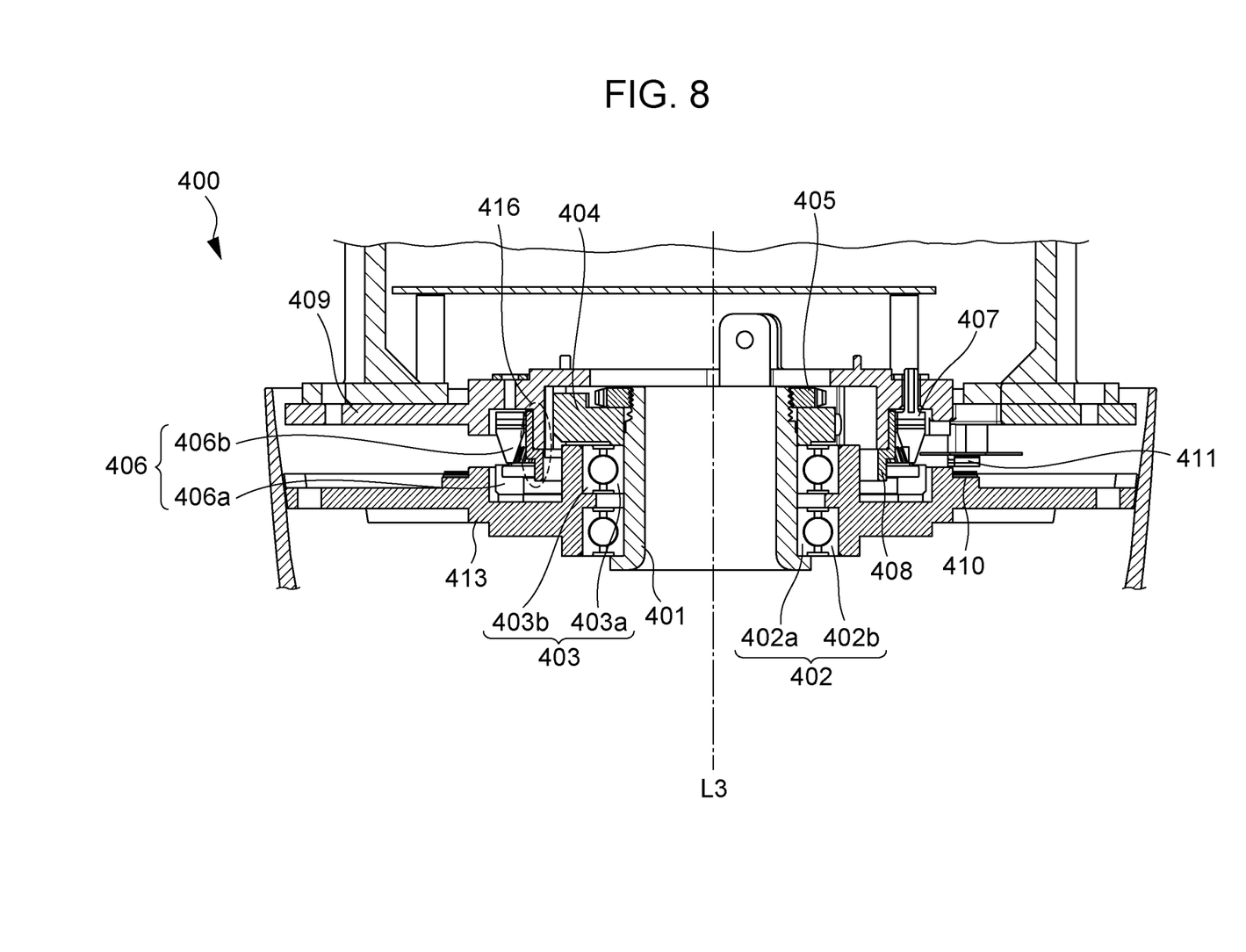
FIG. 8 is a cross-sectional view around a pan rotation shaft according to the exemplary embodiment of the present disclosure.
Figure 9:
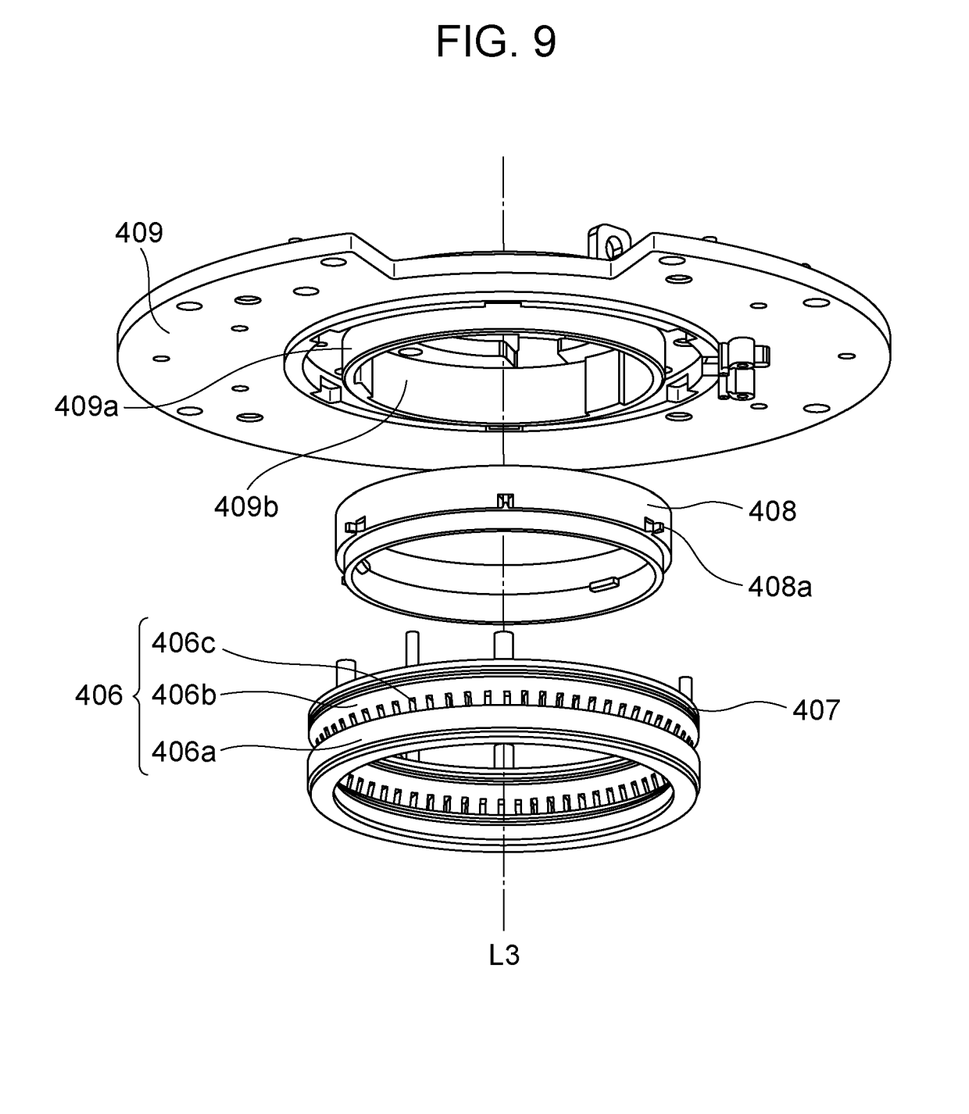
FIG. 9 is an exploded view around an ultrasonic motor of the pan rotation shaft according to the exemplary embodiment of the present disclosure.

FIG. 7 is an exploded view of the pan unit of the image pickup apparatus according to the exemplary embodiment of the present disclosure, FIG. 8 is a cross-sectional view around the pan rotation shaft, and FIG. 9 is an exploded view of an ultrasonic motor of a pan rotation shaft. The pan unit 400 includes the pan rotation shaft 401, the pan base 409, a base member 413, and an ultrasonic motor 406.

The pan base 409 is a substantially circular-shaped member that includes a through hole 409b at the center and rotates during the rotation of the pan. The first support member 323 and the second support member 310 are fixed to the pan base 409. Furthermore, the control substrate 412 is fixed to the pan base 409. The camera 201, the ultrasonic motor 305, the ultrasonic motor 406 described later, and the power supply board 503 are connected to the control substrate 412 with signal lines. The base member 413 is a circular-shaped member that has a through hole 413a at the center. The base member 413 is fixed to the bottom case 501.

The pan rotation shaft 401 is hollow inside and is rotatable about the pan axis L3. A screw portion 401a that engages with a falling-off prevention member 405 is provided at an end portion of the pan rotation shaft 401. Furthermore, a bearing holding member 404 that prevents bearings 402 and 403 from moving in a pan axis L3 direction is inserted over the pan rotation shaft 401. The bearing holding member 404 includes three projections 404a. The three projections 404a are fixed to the pan base 409 by being disposed to correspond to three projections 409d on the pan base 409. The falling-off prevention member 405 is screwed and fixed to a screw portion 401d of the pan rotation shaft 401 to prevent the bearing holding member 404 from falling off from the pan rotation shaft 401. With the above, the bearing holding member 404 is fitted into and fixed to the rotation shaft 401 so that the pan rotation shaft 401 is rotatable about the pan axis L3.

A rotation preventing member 408 is a member that prevents a vibrator 406b from rotating relative to the pan base 409. As illustrated in FIG. 9, the rotation preventing member 408 is fitted into and is supported by an attaching portion 409a on the pan base 409 and is disposed in a fitting space 416 provided in a gap between the attaching portion 409a and the ultrasonic motor 406. The rotation preventing member 408 includes projections 408a that extend in a radial direction of the pan axis L3 at substantially equal intervals. The projections 408a are inserted into gaps of a pectinate portion 406c of the vibrator 406b. With the above, the vibrator 406b is prevented from rotating relative to the pan base 409 about the pan axis L3.

The encoder detects a turn angle of the camera unit 200 in the pan direction. A scale 410 of the encoder is fixed on the base member 413 so as to be coaxial with a rotation shaft 401. A sensor 411 of the encoder is disposed on the pan base 409 so as to correspond to the scale 410 on the base member 413. By reading the value of the sensor 411, the amount of rotation and movement of the pan base 409 relative to the base member 413 can be obtained and the panning angle of the camera unit 200 can be detected.

The ultrasonic motor 406 is a driving source that rotates the camera unit 200 in the pan direction, and is formed of a ring-shaped member. The ultrasonic motor 406 includes the annular vibrator 406b including a signal line 415 (see FIG. 4) for driving, and an annular sliding member 406a. Furthermore, the ultrasonic motor 406 is coaxial with the pan rotation shaft 401 and is disposed around the through hole 413a of the base member 413. In detail, the annular vibrator 406b is disposed on a pan base 409 side and the sliding member 406a is disposed on a base member 413 side.

Furthermore, the sliding member 406a is coaxial with the pan rotation shaft 401 and is fixed on the base member 413. The vibrator 406b is coaxial with the pan rotation shaft 401 and is disposed so as to be in contact with the sliding member 406a. The vibrator 406b is connected to the control substrate 412 with the signal line 415. A biasing member 407 is fitted into and is supported by the pan base 409 so as to bias the vibrator 406b towards the sliding member 406a. In other words, the ultrasonic motor 406 and the biasing member 407 are held between the base member 413 and the pan base 409. In so doing, the biasing member 407 exerts biasing force that is sufficient for the vibrator 406b and the sliding member 406a to rotate relatively. With such biasing force, the vibrator 406b, by vibrating, rotates about the pan rotation shaft relative to the sliding member 406a.

Driving of the camera unit 200 with the ultrasonic motor 406 will be described hereinafter. When a signal is input through the signal line 415 for driving, the vibrator 406b vibrates. With the above, the vibrator 406b rotates in the pan direction relative to the sliding member 406a. Furthermore, since the vibrator 406b is fixed with the rotation preventing member 408 described later so as not to rotate relative to the pan base 409, the pan base 409 also rotates about the pan rotation shaft 401 when the vibrator 406b is vibrated. In other words, the pan rotation shaft 401 is rotated in the pan direction with the vibration of the vibrator 406b. Furthermore, since the first support member 323 and the second support member 310 are fixed to the pan base 409, when the pan base 409 rotates, the camera unit 200 rotates as well.

As described above, by using the ultrasonic motor 406, an image pickup apparatus with better responsiveness, compared to an image pickup apparatus using a stepping motor, can be provided. Furthermore, since the control substrate 412 and the vibrator 406b are disposed on the pan base 409, the signal line 415 connecting the substrate 412 and the vibrator 406b to each other does not become twisted even when the camera unit 200 rotates in the pan direction. Furthermore, while a stepping motor needs a deceleration mechanism, a deceleration mechanism that has a complex gear configuration will not be needed when using an ultrasonic motor. Furthermore, when a stepping motor is used, the deceleration mechanism is provided coaxially with the pan rotation shaft, and the motor is disposed next to the deceleration mechanism. However, in the present embodiment, the ultrasonic motor 406 is disposed coaxially with the pan rotation shaft 301; accordingly, there is no need to dispose the motor next to the pan rotation shaft 301. Accordingly, the unoccupied space can be used to dispose other components.

Since the signal line 414, the rotation shaft 401, the bearing 402, the bearing 403, the bearing holding member 404, and the falling-off prevention member 405 are disposed inside the ultrasonic motor 406 and in the through hole 413a of the base member 413, space can be reduced. Specifically, spaces for the bearings and the members that hold the bearings, which are spaces that are conventionally need in addition to the space for disposing the ultrasonic motor, can be reduced. Accordingly, the size of the body of the image pickup apparatus can be reduced.

Other Exemplary Embodiments

A preferable exemplary embodiment of the present disclosure has been described above; however, the present disclosure is not limited to the above specific exemplary embodiment and may include various modes that do not depart from the spirit and scope of the disclosure. Portions of the exemplary embodiment described above may be combined as appropriate.

For example, the rotor fixing member 302 and the rotation shaft 301 may be separate components. As long as appropriate biasing force is exerted in creating rotational drive between the rotors 305a and 406a of the ultrasonic motors 305 and 406 and the stators 305b and 406b, the biasing members 306 and 407 may be elastic members such as waved washers or rubber.

The signal line 333 that connects the camera 201 and the control substrate 412, and the signal line 414 that connects the control substrate 412 and the power supply board 503 may be flexible printed wiring boards, thin line coaxial cables, or slip rings. Members that fix the rotation preventing members 307 and 408 to the stator fixing member 308 and the pan base 409 may be snap-fit structures or screws.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-167757 filed Aug. 31, 2017, No. 2018-116890 filed Jun. 20, 2018, No. 2017-167756 filed Aug. 31, 2017, and No. 2018-116889 filed Jun. 20, 2018, all of which are hereby incorporated by reference herein in their entirety.

What is claimed is:

1. An image pickup apparatus comprising:
a camera unit including an image pickup element;
a first substrate for the image pickup element;
a second substrate for controlling the image pickup apparatus;
a connecting member that electrically connects the first substrate and the second substrate; and
a ring-shaped ultrasonic motor that includes a rotor and a stator, the ring-shaped ultrasonic motor being disposed coaxial with a tilting rotation shaft and rotationally driving the camera unit about the tilting rotation shaft in a tilt direction,
wherein in a direction in which the tilting rotation shaft extends, the rotor of the ultrasonic motor is disposed on a camera unit side with respect to the stator of the ultrasonic motor, and
wherein the connecting member is inserted into a space on an inner circumference side of the ultrasonic motor.

2. The image pickup apparatus according to claim 1, further comprising:
a rotor fixing member that fixes the rotor; and
a stator fixing member that fixes the stator,
wherein the ultrasonic motor is held between the rotor fixing member and the stator fixing member.

3. The image pickup apparatus according to claim 2, further comprising:
a case member that holds the camera unit,
wherein the rotor fixing member is supported by a lateral surface of the case member.

4. The image pickup apparatus according to claim 2, wherein the rotor fixing member is integrally formed together with the tilting rotation shaft.

5. The image pickup apparatus according to claim 2, further comprising:
an encoder that detects a turn angle of the camera unit in the tilt direction,
wherein a scale of the encoder is disposed on the rotor fixing member, and a sensor of the encoder is disposed on the stator fixing member.

6. The image pickup apparatus according to claim 2, further comprising,
a rotation preventing member that prevents the stator of the ultrasonic motor from rotating and moving relative to the stator fixing member,
wherein the rotation preventing member is disposed between the ultrasonic motor and the stator fixing member.

7. The image pickup apparatus according to claim 1, wherein the tilting rotation shaft is hollow inside, and
wherein the connecting member is inserted into an inner space of the tilting rotation shaft.

8. The image pickup apparatus according to claim 1, further comprising:
a bearing that rotatably supports the tilting rotation shaft,
wherein the bearing is disposed in the space on the inner circumference side of the ultrasonic motor.

9. The image pickup apparatus according to claim 8, wherein the stator fixing member includes a through hole, the bearing and the rotation shaft being disposed in the through hole.

10. The image pickup apparatus according to claim 9, further comprising:
a holding member that holds the bearing,
wherein the holding member is disposed in the through hole of the stator fixing member.

11. An image pickup apparatus comprising:
a camera unit including an image pickup element;
a ring-shaped ultrasonic motor that includes a rotor and a stator, the ring-shaped ultrasonic motor being disposed coaxial with a tilting rotation shaft and rotationally driving the camera unit about the tilting rotation shaft in a tilt direction,
a rotor fixing member that fixes the rotor;
a stator fixing member that fixes the stator; and
a rotation preventing member that prevents the stator of the ultrasonic motor from rotating and moving relative to the stator fixing member, wherein in a direction in which the tilting rotation shaft extends, the rotor of the ultrasonic motor is disposed on a camera unit side with respect to the stator of the ultrasonic motor, and wherein the rotation preventing member is disposed between the ultrasonic motor and the stator fixing member.

12. The image pickup apparatus according to claim 11, further comprising:

a case member that holds the camera unit, wherein the rotor fixing member is supported by a lateral surface of the case member.

13. The image pickup apparatus according to claim 11, wherein the rotor fixing member is integrally formed together with the tilting rotation shaft.

14. The image pickup apparatus according to claim 11, further comprising:

a first substrate for the imaging pickup element;

a second substrate for controlling the image pickup apparatus; and a connecting member that electrically connects the first substrate and the second substrate; the connecting member being inserted in a space on an inner circumference side of the ultrasonic motor.

15. The image pickup apparatus according to claim 14, wherein the tilting rotation shaft is hollow inside, and wherein the connecting member is inserted in an inner space of the tilting rotation shaft.

16. The image pickup apparatus according to claim 11, further comprising:

a bearing that rotatably supports the tilting rotation shaft, wherein the bearing is disposed in the space on the inner circumference side of the ultrasonic motor.

17. The image pickup apparatus according to claim 16, wherein the stator fixing member includes a through hole, the bearing and the rotation shaft being disposed in the through hole.

18. The image pickup apparatus according to claim 17, further comprising:

a holding member that holds the bearing, wherein the holding member is disposed in the through hole of the stator fixing member.

19. The image pickup apparatus according to claim 11, further comprising:

an encoder that detects a turn angle of the camera unit in the tilt direction, wherein a scale of the encoder is disposed on the rotor fixing member, and a sensor of the encoder is disposed on the stator fixing member.

* * * * *